United States Patent
Hirakoso

(10) Patent No.: US 7,468,749 B2
(45) Date of Patent: Dec. 23, 2008

(54) IMAGE TAKING APPARATUS, AND A METHOD OF CONTROLLING AN EDGE ENHANCING LEVEL OF AN ORIGINAL IMAGE SIGNAL

(75) Inventor: Hiroto Hirakoso, Tokyo (JP)

(73) Assignee: Sony Corporation (JP)

( * ) Notice: Subject to any disclaimer, the term of this patent is extended or adjusted under 35 U.S.C. 154(b) by 702 days.

(21) Appl. No.: 10/785,956

(22) Filed: Feb. 26, 2004

(65) Prior Publication Data

US 2004/0183927 A1    Sep. 23, 2004

(30) Foreign Application Priority Data

Mar. 19, 2003    (JP)    ............... P2003-075978

(51) Int. Cl.
  H04N 5/208    (2006.01)
  H04N 5/262    (2006.01)
  G06K 9/40    (2006.01)
(52) U.S. Cl. ............... 348/252; 348/240.2; 348/222.1; 382/266; 382/261
(58) Field of Classification Search .......... 348/252, 348/240.2; 382/266
  See application file for complete search history.

(56) References Cited

U.S. PATENT DOCUMENTS

| | | | |
|---|---|---|---|
| 5,374,995 A * | 12/1994 | Loveridge et al. | ........... 358/447 |
| 5,838,371 A * | 11/1998 | Hirose et al. | ............. 348/240.2 |
| 5,880,767 A * | 3/1999 | Liu | ............................. 347/251 |
| 7,292,268 B2 * | 11/2007 | Hyodo et al. | ............ 348/207.2 |
| 2004/0174444 A1 * | 9/2004 | Ishii | ........................ 348/240.1 |

FOREIGN PATENT DOCUMENTS

| | | | |
|---|---|---|---|
| JP | 57-174986 | | 10/1982 |
| JP | 07177407 A | * | 7/1995 |
| JP | 07177531 A | * | 7/1995 |
| JP | 2000-156816 | | 6/2000 |
| JP | 2000156816 A | * | 6/2000 |
| JP | 2000-278592 | | 10/2000 |
| JP | 2002149105 A | * | 5/2002 |

OTHER PUBLICATIONS

Japanese Office Action; Application No. 2003-075975; Dated: Jan. 31, 2007.

* cited by examiner

*Primary Examiner*—David L Ometz
*Assistant Examiner*—Wanda M Negron
(74) *Attorney, Agent, or Firm*—Rader, Fishman & Grauer PLLC; Ronald P. Kananen

(57) ABSTRACT

According to the image taking apparatus and the method of controlling an edge enhancing level of an original image signal, as the electronic zooming rate for the original image signal increases, an amplitude level of the edge signal decreases in a direction contrary to the increase of the electronic zooming rate, and thereby, an edge enhancing level of the edge-enhanced image signal is automatically suppressed. Accordingly, even though zooming processing is applied to the edge-enhanced image signal, it is able to obtain an enlarged image signal having natural edges by suppressing excess enlargement of the edge signal added to the original image signal.

10 Claims, 4 Drawing Sheets

FIG.7A
BACKGROUND ART
FIG.7B
BACKGROUND ART
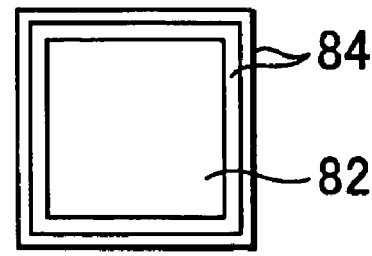
FIG.8A
BACKGROUND ART
FIG.8B
BACKGROUND ART
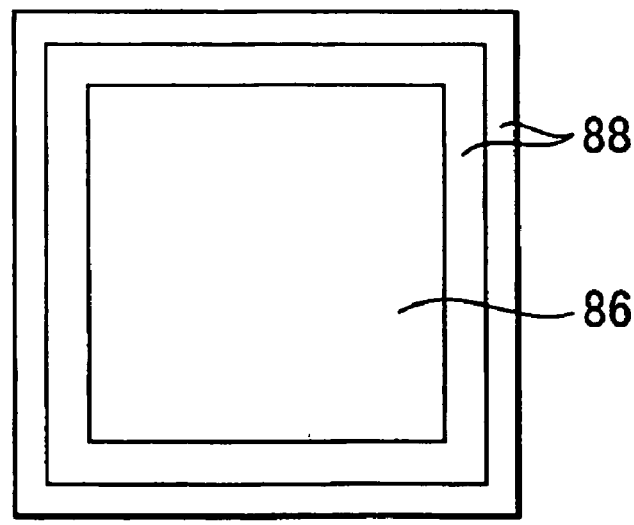

IMAGE TAKING APPARATUS, AND A METHOD OF CONTROLLING AN EDGE ENHANCING LEVEL OF AN ORIGINAL IMAGE SIGNAL

CROSS REFERENCE TO RELATED APPLICATION

This application claims priority from Japanese Priority Document No. 2003-075978, filed on Mar. 19, 2003 with the Japanese Patent Office, which document is hereby incorporated by reference.

BACKGROUND OF THE INVENTION

1. Field of the Invention

This invention relates to an image taking apparatus having an edge enhancing function and an electronic zooming function, and also to a method for automatically controlling an edge enhancing level of an original image signal in conjunction with an electronic zooming rate.

2. Description of the Related Art

An image taking apparatus such as one applied to a digital still camera, a video camera for medical use and the like is equipped with an edge enhancing function for enhancing edges of an original taking image signal for the purpose of improving the sharpness of the original taking image, and an electronic zooming function for enlarging the extracted part of the taking image by digital processing. Please see Japanese Laid-Open Patent JP2000-278592, for example.

Edge enhancing means for performing the above mentioned edge enhancing function in the image taking apparatus generates an edge signal, as shown in FIG. 6B, based on an original image signal, as shown in FIG. 6A, and outputs an edge-enhanced image signal, as shown in FIG. 6C, by superposing the thus obtained edge signal onto the original image signal. Thereby, the edge-enhanced image signal to which an edge enhancing signal 84 is superposed at the edge portion located on the periphery of the original image signal 82 is obtained, as shown in FIG. 8A. Accordingly, the sharpness of the whole image signal is improved.

In addition, electronic zooming means for performing the above mentioned electronic zooming function extracts a part of the original image signal, that is, 4 pixels of the original image signal, as shown in FIG. 7A, for example, and enlarges these 4 pixels of the original image signal at a predetermined magnification rate, that is, 2 times in this case, in the vertical and horizontal directions. As the result, it is able to obtain the enlarged, original image signal, as shown in FIG. 7B.

However, according to such a conventional image taking apparatus, in the case of performing an enlarging processing of 2 times, for example, by the electronic zooming means to the image signal after the edge of the image signal is enhanced by the edge enhancing means, as shown in FIG. 7, an image portion 86 is magnified by 2 in the vertical and horizontal directions as shown in FIG. 8B, and an edge enhancing signal 88 is also magnified by the same magnification rate. If the edge enhancing signal 88 is magnified by 2 times, as described above, the edge signal for enhancing the sharpness of the taking image signal is magnified more than necessary, so that there is a problem that the enlarged image signal becomes an edge-enhanced image having wide and unnatural edges as compared with a desirable output image signal.

This invention was created to solve the above mentioned problems, and one aspect of the present invention is to present an image taking apparatus and a method of controlling an edge enhancing level of an original image signal capable of obtaining an enlarged image signal having natural edges by suppressing the enlargement of the edge signal to be added to the original image signal when carrying out zooming processing of the edge-enhanced image signal.

SUMMARY OF THE INVENTION

An image taking apparatus according to the present invention includes edge enhancing means for generating edge signals based on an original image signal and for obtaining an edge-enhanced image signal (edges of the original image signal are enhanced) by adding the edge signals to the original image signal, electronic zooming means for zooming the edge-enhanced image signal by digitally processing the edge-enhanced image signal, and is characterized by further comprising control means for suppressing the edge enhancing level by changing amplitude levels of the edge signals generated in the edge enhancing means by a decrease contrary to the increase of the electronic zooming rate.

Further, the present invention proposes a method of controlling an edge enhancing level of an original image signal, wherein an edge-enhanced image signal is generated by adding edge signals generated based on an original image signal, the size of the edge-enhanced image signal is electronically changed by digital processing including an electronic zooming rate changing function, and as the electronic zooming rate increases, the edge enhancing level of the edge-enhanced image signal is suppressed by decreasing amplitude levels of the edge signals in a direction contrary to the increase of the electronic zooming rate.

According to the image taking apparatus and the method of controlling an edge enhancing level of an original image signal, as the electronic zooming rate for the image signal increases, the amplitude level of the edge signal decreases in a direction contrary to the increase of the electronic zooming rate, and thereby, the edge enhancing level of the edge-enhanced image signal is automatically suppressed. Accordingly, even though the edge-enhanced image signal is applied a zooming processing, it is able to obtain an enlarged image signal having natural edges by suppressing excess enlargement of the edge signal added to the original image signal.

BRIEF DESCRIPTION OF THE DRAWINGS

In the accompanying drawings:

FIGS. 7A to 7B is a chart for describing a status of an electronic zooming operation of an image signal; and FIGS. 8A to 8B is a chart for describing a conventional edge enhancing processing of an image signal and an enlarged edge-enhanced image.

DETAILED DESCRIPTION OF THE PREFERRED EMBODIMENTS

Figure 1:
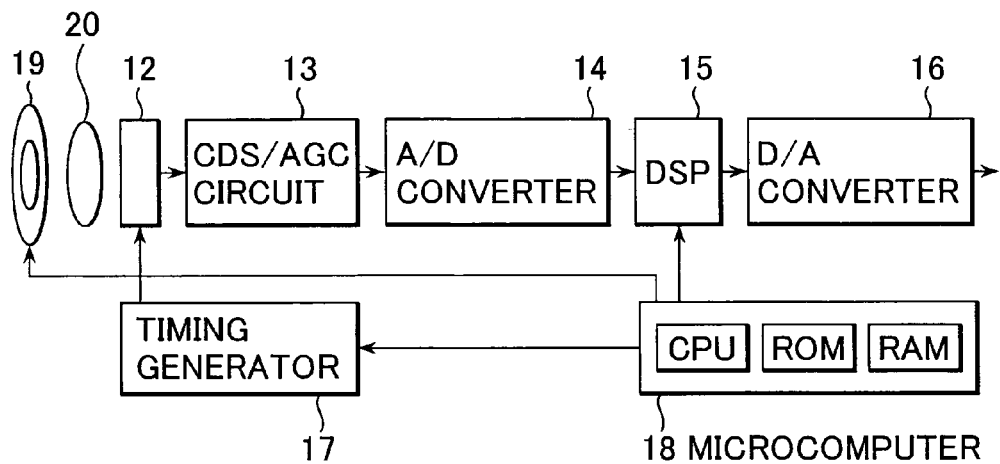
FIG. 1 is a block diagram showing a total configuration of an image taking apparatus of the present invention.

Hereinafter, one exemplified embodiment of an image taking apparatus and a method for controlling an edge enhancing level of an original image signal of the present invention is described. In this case, the embodiment described herein is one of preferable embodiments, and technically preferable specific limitations are added, but the scope of the present invention is not restricted by those limitations unless recited in the appended claims.

An image taking apparatus 10 of the present invention is configured to include a solid state imaging device 12, a CDS/AGC circuit 13, an A/D converter 14, a DSP 15, a D/A converter 16, a timing generator (TG) 17, a microcomputer 18, and the like. The solid state imaging device 12 has a CCD structure, for example, and is configured to detect lights from an object by image sensors arranged on a semiconductor substrate in matrix form through an electronic iris 19 controlled by a microcomputer 18 and a lens 20 and to output an image signal of the object by transferring electronic charges generated by the image sensor through vertical charge transfer registers and horizontal charge transfer registers. In addition, the solid state imaging device 12 operates based on clock signals supplied from the timing generator (TG) 17, a vertical synchronizing signal and a horizontal synchronizing signal, and it is configured to alternately output an even field image signal and an odd field image signal forming one frame in an interlaced manner.

The CDS/AGC circuit 13 carries out CDS (Correlated Double Sampling) to the original image signal from the solid state imaging device 12, removes fixed pattern noises, such as reset noises, included in the original image signal, and stabilizes the signal level of the image signal by an AGC (automatic gain control).

The A/D converter 14 converts the output image signal from the CDS/AGC circuit 13 into a digital signal, and thus a digitized original image signal is taken into the DSP 15 and is stored in an image memory (not shown).

The DSP 15 is equipped with an edge enhancing function for improving the sharpness of whole image signal by enhancing edges of the original image signal and an electronic zooming function for enlarging part of the edge-enhanced image by digital processing and the like.

The D/A converter 16 converts the edge-enhanced image signal outputted from the DSP 15 into an analog signal and outputs it as an output video signal.

The microcomputer 18 includes a CPU, a ROM and a RAM and carries out various functions using the CPU and the RAM based on program data stored in the ROM.

Figure 2:
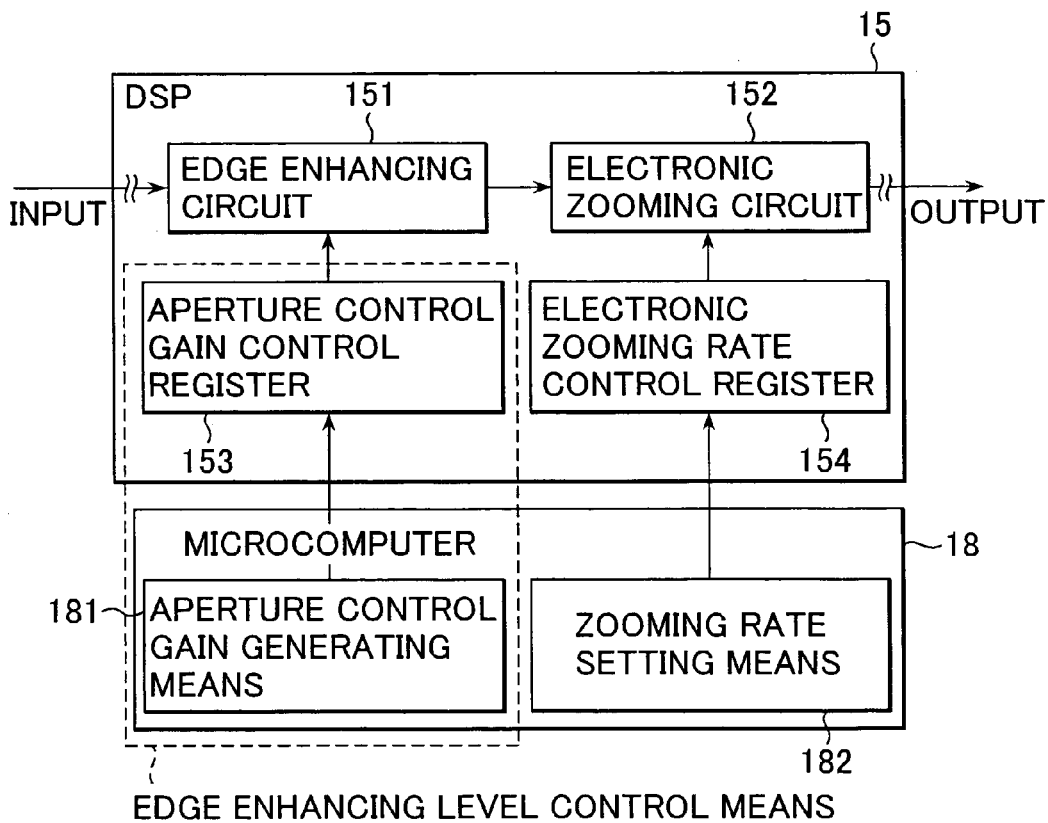
FIG. 2 is a functional block diagram designating a conceptual internal configuration of a DSP and a microcomputer in FIG. 1.

Next, the configuration in FIG. 2 is described. In FIG. 2, the DSP 15 is configured to include an edge enhancing circuit 151 for improving the sharpness of a whole image by enhancing edges of the original image signal, an electronic zooming circuit 152 for carrying out enlargement and pixel interpolation using digital processing by extracting a part of the edge-enhanced image signal done by the edge enhancing circuit 151, an aperture control gain control register 153, and an electronic zooming rate control register 154. Further, the microcomputer 18 is configured to include an aperture control gain generating means 181 and a zooming rate setting means 182; and their operations are performed by the CPU based on program data for generating aperture control gain and zooming rate setting program data stored in the ROM while using the RAM.

The aperture control gain generating means 181 changes the amplitude level of the edge signal generated at the edge enhancing circuit 151 based on the original image signal in response to an electronic zooming rate so that the amplitude level of the edge signal decreases as the electronic zooming rate increases; and the zooming rate setting means 182 is to set the electronic zooming rate of the edge-enhanced image signal from the edge enhancing circuit 151. Further, the aperture control gain control register 153 temporary stores aperture control gain data generated in the aperture control gain generating means 181 and controls the amplitude level of the edge signal generated in the edge enhancing circuit 151 based on the aperture control gain data, so that the amplitude level of the edge signal decreases as the electronic zooming rate increases. Further, the electronic zooming rate control register 154 temporary stores the electronic zooming rate data defined in the zooming rate setting means 182 and controls the electronic zooming circuit 152 based on the electronic zooming rate data.

In this case, the aperture control gain control register 153 and the aperture control gain generating means 181 configure an edge enhancing level control means 190.

Figure 3:
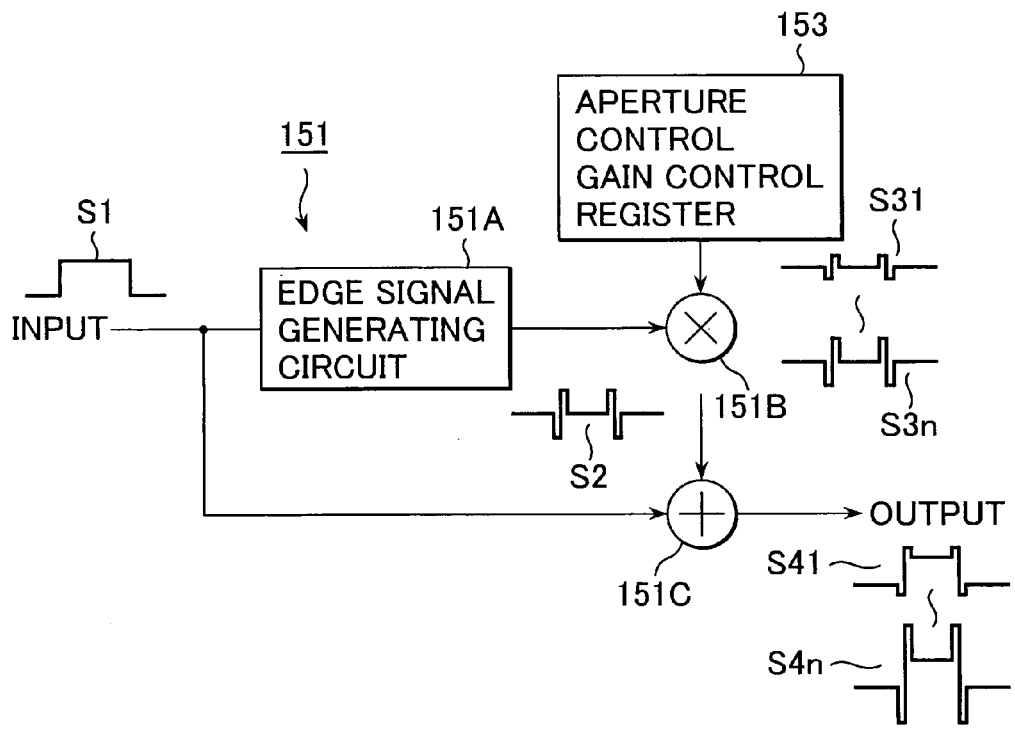
FIG. 3 is a block diagram of an edge enhancing circuit according to the present invention.

Next, the configuration of the edge enhancing circuit 151 in FIG. 3 is described. In FIG. 3, the edge enhancing circuit 151 is configured to include an edge signal generating circuit 151A for generating an edge signal S2 based on an inputted image signal S1 (original image signal), a multiplier 151B for outputting edge signals S31 to S3$n$ having amplitude levels depending on the electronic zooming rate by multiplying the edge signal S2 from the edge signal generating circuit 151A and the aperture control gain dataset in the aperture control gain control register 153, and an adder 151C for outputting edge-enhanced image signals S41 to S4$n$ by adding the amplitude level adjusted edge signals S31 to S3$n$ to the image signal S1 (original image signal).

The operation of the thus configured image taking apparatus 10 is described. The original image signal from the solid state imaging device 12 is supplied to the CDS/AGC circuit 13 by operating with the clock signals, the vertical synchronizing signal, and the horizontal synchronizing signal from the timing generator (TG) 17, the fixed pattern noises included in the image signal are removed, and the signal level is stabilized by the AGC (automatic gain control). After that, the output signal from the CDS/AGC circuit 13 is converted into a digital signal at the A/D converter 14, and the thus digitized original image signal is taken into the DSP 15.

The image signal S1 taken into the DSP 15 is enhanced on the edge by the edge enhancing circuit 15 so that the sharpness of the whole image is improved. Namely, the edge signal generating circuit 151A of the edge enhancing circuit 151 generates the edge signal S2 based on the inputting image signal S1 (original image signal) and outputs the signal to the multiplier 151B. The multiplier 151B adjusts the amplitude level of the edge signal S2 depending on the electronic zooming rate by multiplying the aperture control gain data set in the aperture control gain control register 153 and the edge signal S2 from the edge signal generating circuit 151A. Thereby, as shown in FIG. 3, the edge signals S31 to S3$n$, each having different amplitude levels as the result of the amplitude level adjustment, are output from the multiplier 151B. Further, the adder 151C outputs the edge-enhanced image signals S41 to S4$n$ to which the edge signals having different amplitude levels are added by adding the amplitude level adjusted edge signals S31 to S3$n$ to the image signal S1 (original image signal) as shown in FIG. 3. In this case, the edge-enhanced image signal S41 corresponds to a case where the electronic zooming rate is maximum (4 times or more), and the edge-enhanced image signal S4$n$ corresponds to a case where the electronic zooming rate is minimum (2 times or less).

The aperture control gain for adjusting the amplitude level of the edge signal S2 is automatically set when the electronic zooming rate is set at the zooming rate setting means 182. That is, when the electronic zooming rate is set at the zooming rate setting means 182, the aperture control gain is calculated by calculating means of the CPU using the program data for gain generation stored in the ROM based on the electronic zooming rate set in the zooming rate setting means 182, and the thus obtained aperture control gain is set to the aperture control gain control register 153.

Figure 4:
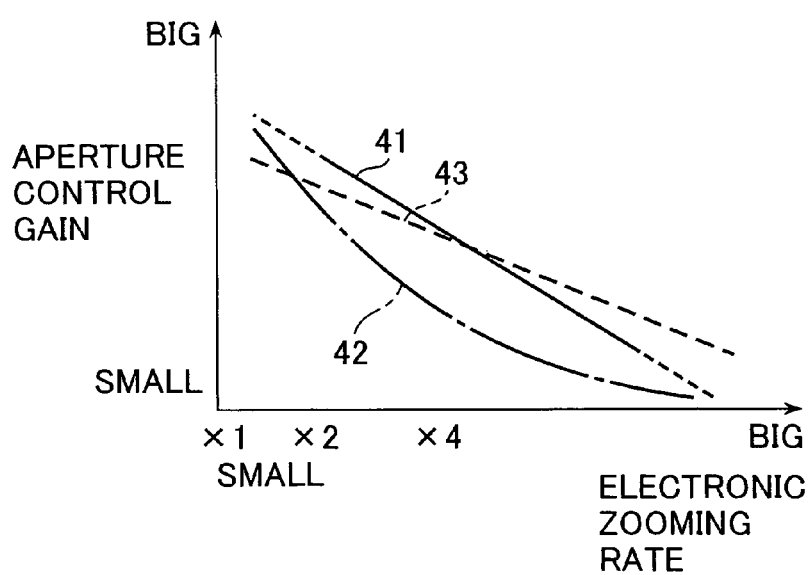
FIG. 4 is a graph showing a relation between the electronic zooming rate and the aperture control gain according to the present invention.
Figure 5:
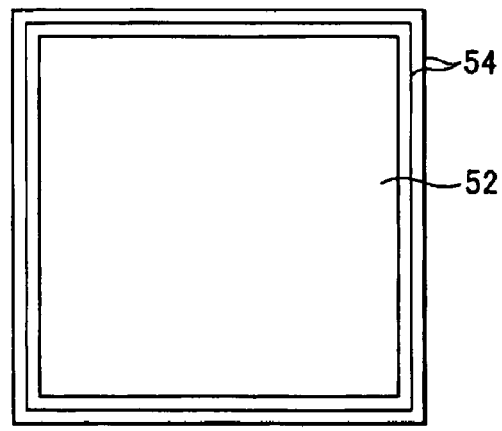
FIG. 5 is a chart for describing the enlarged edge-enhanced image according to the present invention.
Figure 6A:
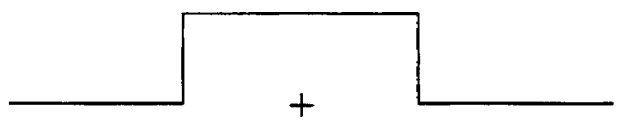
FIGS. 6A to 6C are waveforms for describing the edge enhancing processing of an image signal.
Figure 6B:
Figure 6C:

In this case, the aperture control gain and the electronic zooming rate have the relation of a linear function, as shown a graph 41 in FIG. 4. As apparent from this graph 41, as the electronic zooming rate increases×1, ×2, ×3, ×4, the aperture control gain decreases contrary to the increase of the electronic zooming rate. Accordingly, even if the edge signal added to the image signal by zooming processing of the edge-enhanced image signal, the edge signal is not enlarged as much as the conventional enlarged image signal shown in FIG. 8B, and as shown in FIG. 5, the pixels forming the edge signal 54 for edge enhancement and surrounding the image 52 are 1 to 2 pixels. As the result, the enlarged whole image signal having natural edges is able to be obtained without any glare.

In this case, in the above mentioned embodiment, the aperture control gain of the image signal to the electronic zooming rate is described in a case where the aperture control gain changes like a linear function as shown in the graph 41 in FIG. 4; but the present invention is not limited to this; the aperture control gain may change like an exponential function as shown in the one-dot chain graph 42 in FIG. 4. Further, the aperture control gain characteristic relative to the electronic zooming rate of the image signal may have a smaller angle than the graph 41, as shown by the broken line graph 43 in FIG. 4. In addition, the embodiment of the present invention is described in a case where the aperture control gain generating means 181 is configured with calculating means including the program data for gain generation stored in the ROM and CPU for executing the program; but the present invention is not limited this, and it is possible to configure the aperture control gain generating means 181 as a search table including each of the electronic zooming rate data of the image signal and the aperture control gain data corresponding to each of the electronic zooming rate data, such that the aperture control gain generating means 181 is able to output the aperture control gain data depending on the electronic zooming rate data by searching the search table.

As described above, according to the image taking apparatus and the method of controlling the edge enhancing level of the image signal of the present invention, as the electronic zooming rate of the image signal increases, the amplitude level of the edge signal decreases contrary to the increase of the electronic zooming rate, and thereby, the edge enhancing level of the edge signal added to the edge-enhanced image signal is automatically controlled, so that even if the edge signal added to the original image signal is enlarged by enlarging the edge-enhanced image signal by zooming processing, the edge signal is not enlarged like conventional enlarged image, and the pixels forming the edge signal for edge enhancement and surrounding the image are 1 to 2 pixels. As a result, it is possible to obtain an enlarged image having natural edges without glare.

What is claimed is:

1. An image taking apparatus having edge enhancing means for generating an edge signal based on an original image signal and for obtaining an edge-enhanced image signal by adding the edge signal onto the original image signal, and electronic zooming means for zooming the thus obtained edge-enhanced image signal with various electronic zooming rates by digital processing, comprising:

control means for suppressing an edge enhancing level of the edge-enhanced image signal by controlling an amplitude level of the edge signal generated in the edge enhancing means as said electronic zooming rate increases and the amplitude level of the edge signal decreases.

2. The image taking apparatus as cited in claim 1, wherein:

said edge enhancement level control means comprises:

aperture control gain generating means for changing the amplitude level of the edge signal in response to the electronic zooming rate of the original image signal;

storage means for temporarily storing aperture control gain data generated at said aperture control gain generating means; and an aperture control gain control register for controlling the amplitude level of the edge signal generated at the edge enhancing means based on the aperture control gain data.

3. The image taking apparatus as cited in claim 2, wherein:

said aperture control gain generating means comprises calculating means for calculating an aperture control gain in response to the electronic zooming rate of the original image signal.

4. The image taking apparatus as cited in claim 2, wherein:

each of the electronic zooming rate of the original image signal and the aperture control gain data previously set depending on said each of the electronic zooming rate are formed to be a search table at said aperture control gain generating means, and said aperture control gain generating means is configured to output the aperture control gain data depending on said electronic zooming rate by searching said search table.

5. The image taking apparatus as cited in claim 3 or 4, wherein:

said aperture control gain has a relation of changing like a linear function or changing like an exponential function relative to the electronic zooming rate.

6. The image taking apparatus as cited in claim 1, further comprising:

zooming rate setting means for setting the electronic zooming rate of the original image signal; and an electronic zooming rate control register for temporarily storing electronic zooming rate set by said zooming rate setting means, and for controlling said electronic zooming means based on said electronic zooming rate.

7. A method of controlling an edge enhancing level of an original image signal having a function of changing, by digital processing, an electronic zooming rate of an edge-enhanced image signal obtained by adding an edge signal generated based on the original image signal and the image signal, said method comprising the step of:

suppressing the edge enhancing level of the edge-enhanced image signal by controlling an amplitude level of the edge signal generated in the edge enhancing means as said electronic zooming rate increases and the amplitude level of the edge signal decreases.

8. The method as cited in claim 7, wherein:

said amplitude level of the edge signal is controlled based on aperture control gain data generated for changing the amplitude level of the edge signal depending on the electronic zooming rate of the original image signal.

9. An image taking apparatus comprising:
zooming rate setting means adapted to control an electronic zooming rate of an image signal;
aperture control gain generating means adapted to control an aperture control gain of an edge signal;
an edge enhancing circuit adapted to convert said image signal into said edge signal, said aperture control gain decreasing as said electronic zooming rate increases.

10. The image taking apparatus as cited in claim 9, further comprising:
a multiplier adapted to multiply said edge signal by said aperture control gain to form an adjusted edge signal;
an adder adapted to add said adjusted edge signal with said image signal to form an edge-enhanced image signal.

* * * * *